United States Patent [19]

Seron

[11] Patent Number: 5,027,477
[45] Date of Patent: Jul. 2, 1991

[54] BREAK AWAY LANYARD

[75] Inventor: Suren V. Seron, Plattville, Ill.

[73] Assignee: Seron Manufacturing Company, Joliet, Ill.

[21] Appl. No.: 326,007

[22] Filed: Mar. 20, 1989

[51] Int. Cl.[5] .................. A44B 21/00; A01K 1/06
[52] U.S. Cl. .................................. 24/3 B; 24/3 R; 24/598.4; 24/602; 119/106
[58] Field of Search ............... 24/3 B, 3 R, 3 A, 3 C, 24/7, 8, 9, 241 PS, 241 SP, 241 SB, 239, 237, 233, 615, 616, 602; 411/339; 403/2; 119/106

[56] References Cited

U.S. PATENT DOCUMENTS

| | | |
|---|---|---|
| 231,751 | 8/1880 | Bailey et al. .................. 24/233 |
| 967,664 | 8/1910 | Peterson ....................... 24/233 |
| 1,684,322 | 9/1928 | Itjen ............................ 24/239 |
| 2,481,946 | 9/1949 | Pendleton .................... 24/3 C |
| 2,612,139 | 9/1952 | Collins . | 
| 2,825,112 | 3/1958 | Frieder et al. ............... 24/239 |
| 3,530,547 | 9/1970 | Robinson . |
| 3,540,089 | 11/1970 | Franklin ..................... 24/602 |
| 3,589,341 | 6/1971 | Krebs . |
| 3,861,813 | 1/1975 | Seron .......................... 24/237 |
| 3,982,747 | 9/1976 | Schweinsberg . |
| 3,994,265 | 11/1976 | Banks . |
| 3,995,598 | 12/1976 | Gardner et al. . |
| 4,041,562 | 8/1977 | Nealy .......................... 24/3 A |
| 4,186,690 | 2/1980 | Seiler .......................... 24/602 |
| 4,226,589 | 10/1980 | Klein ........................... 24/602 |
| 4,665,592 | 5/1987 | Kasai ........................... 24/237 |

FOREIGN PATENT DOCUMENTS

| | | | |
|---|---|---|---|
| 29191 | 1/1922 | Denmark ................. | 24/233 |
| 599471 | 3/1948 | United Kingdom ...... | 24/241 PS |
| 930869 | 7/1963 | United Kingdom . | |

Primary Examiner—Victor N. Sakran
Attorney, Agent, or Firm—Wood, Phillips, Mason, Recktenwald & Vansanten

[57] ABSTRACT

A lanyard construction including a strap 10 forming a closed loop of flexible material adapted to be disposed about a part 20 of a human body, a mounting element 16 on the loop at a fixed location thereon for mounting an object 18 to be displayed or used by the wearer of the lanyard, and a breakaway element 22, 24, 26 defining a weak point whereat the loop may be open and be pulled free from the wearer.

14 Claims, 1 Drawing Sheet

BREAK AWAY LANYARD

FIELD OF THE INVENTION

This invention relates to an assembly that includes a strap that is adapted to be placed about a body part, such as a lanyard or the like.

BACKGROUND OF THE INVENTION

There are many types of articles that include a strap to be worn about a part of the body which may be generically termed lanyards and may include loop-like elements worn about the neck or the wrist and even belts worn about the waist. In many cases, these lanyards are fitted with some sort of a mounting element such that another article may be attached to the strap. For example, identification cards may be affixed to lanyards such as belts or loops worn about the neck. Sports officials frequently will attach whistles to loops worn about the wrist.

While such uses of lanyards are advantageous, they are not without their drawbacks. For example, a worker around machinery and wearing an identification card as is a fairly common occurrence attached either to a belt or to a loop worn about the neck can be severely injured if the loose identification card attached lanyard becomes caught in the machinery and pull the worker into the machinery. Similarly, unruly fans at sporting events might grab a sport official's whistle or the like such that injury could occur to the sports official if he could not break away from the fan.

The present invention is directed to overcoming one or more of the above problems.

SUMMARY OF THE INVENTION

It is the principal object of the invention to provide a new and improved lanyard construction that may readily break away. It is also an object of the invention to provide a hook assembly whereby an object may be secured to a strap or a lanyard as well as a break away fixture for use in the lanyard construction.

According to one facet of the invention, there is provided a lanyard construction which includes a strap forming a closed loop of flexible material adapted to be disposed about a part of a human body. A mounting element is on the loop at a fixed location for mounting an object to be displayed or used by the wearer of the lanyard and there are provided means defining a weak point in the strap whereat the loop may open and be pulled free from the wearer, the weak point being at a location remote from the fixed location about the periphery of the loop.

According to a preferred embodiment of the invention, the weak point defining means comprises interengaging male and female parts. In one embodiment of the invention, the weak point includes a recess having a narrow opening and resilient fingers with enlarged tips disposable in the recess through such opening.

The invention thus contemplates a break away assembly including a first fixture with a base having a resilient projection with a bifurcated, generally circular tip and means on the base for securing a strap thereto. Also included is a second fixture which has a recess opening to exterior with the recess including a circular inner end of about the same size as the tip and a mouth opening to the inner end and defined by converging walls. The walls adjacent the inner end are spaced a distance less than the diameter of the tip. The second fixture is also provided with means for securing a strap thereto.

In a highly preferred embodiment, the breakaway assembly has the projection defined by two spaced fingers and the circular tip includes semi-circular end on each of the fingers. Preferably, the strap securing means comprises a strap receiving recess.

The invention also contemplates that the mounting element be secured to two ends of the strip and be formed of a plastic material to include a recess for receipt of the ends of the strip and bonding means bonding the ends to each other and to the mounting element. In a highly preferred embodiment of the invention, the mounting element is a hook assembly which includes a base and an integral hook extending from the base and terminating in a redirected end facing the base. An integral, resilient finger is on the base and adjacent the hook and extends toward the end of the hook and is engagable therewith. The assembly is formed with a single piece of plastic.

In a highly preferred embodiment of the hook assembly, the finger and hook come together at the base in an interface and the assembly further includes a recess at the interface. Preferably, the interface is semi-circular.

Other objects and advantages will become apparent from the following specification taken in connection with the accompanying drawings.

DESCRIPTION OF THE PREFERRED EMBODIMENT

Figure 1:
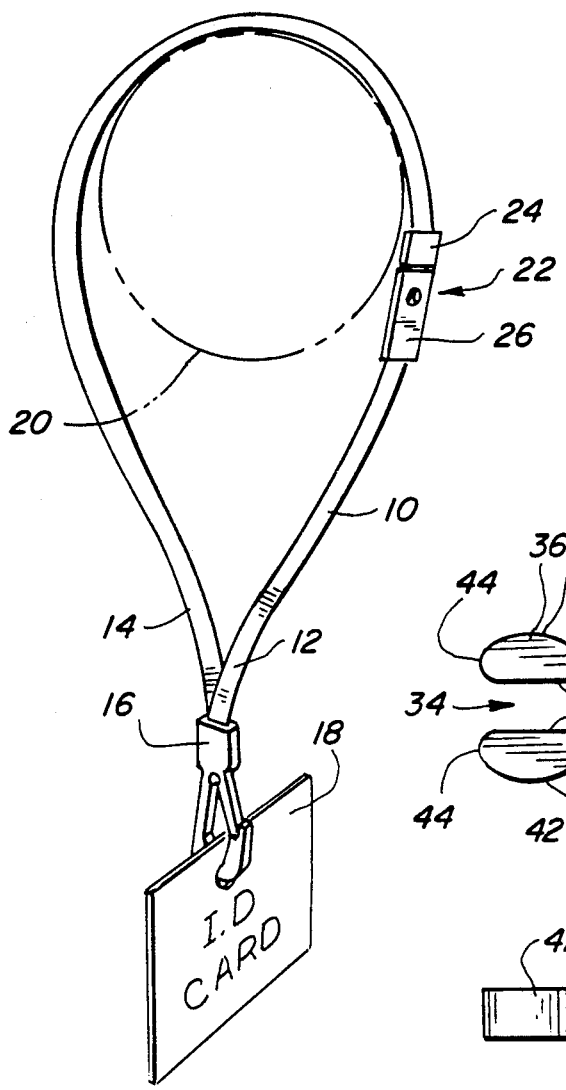
FIG. 1 is a perspective view of a lanyard made according to the invention.

An exemplary embodiment of a lanyard made according to the invention is illustrated in FIG. 1 and is seen to include an elongated strap 10 of flexible material such as plastic or cloth.

Two ends 12 and 14 of the strap 10 come together and are joined to a mounting element in the form of a hook 16. The hook 16 may be utilized to mount, for example, an identification card 18, to the strap 10. Typically, with the strap ends 12 and 14 brought together, a closed loop is formed as illustrated in FIG. 1 which may be placed about some part of the body of the wearer. In the embodiment illustrated, the neck 20 of an individual wearing the lanyard is shown in dotted lines However, it is to be understood that the lanyard can be worn around the waist, wrist, etc. It is also to be understood that other forms of mounting elements other than hooks may be utilized in lieu of the hook 16 and that objects other than identification cards such as the card 18 may be mounted thereto.

According to the invention, the strap 10 includes a weak point defined by a breakaway fixture, generally designated 22. The breakaway fixture 22 includes interengaging male and female parts 24 and 26 which may separate to allow the strap 10 to be pulled free from the part of the human body about which it is placed. Of particular concern is the fact that the breakaway assembly 22 be located at a point remote from the fixed location on the strap 10 whereat the mounting element or hook 16 is located. When the lanyard is intended to be worn about the neck, it is preferable that the breakaway assembly 22 be disposed to be at the side of the neck as seen in FIG. 1.

The purpose of locating the breakaway fixture 22 remotely from the hook 16 is as follows. Were the object 18 mounted on the hook 16 be caught in machinery, if the break away assembly 22 were in close proximity to the hook 16, it could also get caught in the machinery quite rapidly and before it had a chance to separate. In such a case, it would be of no use. Similarly, in the case of the sports official who may be accosted by an unruly fan, if the breakaway assembly 22 is too close to the hook 16, the fan could possibly grab the strap 10 at a location between the breakaway assembly 22 and the body part 20, again resulting in the breakaway assembly being completely ineffective.

Figure 2:
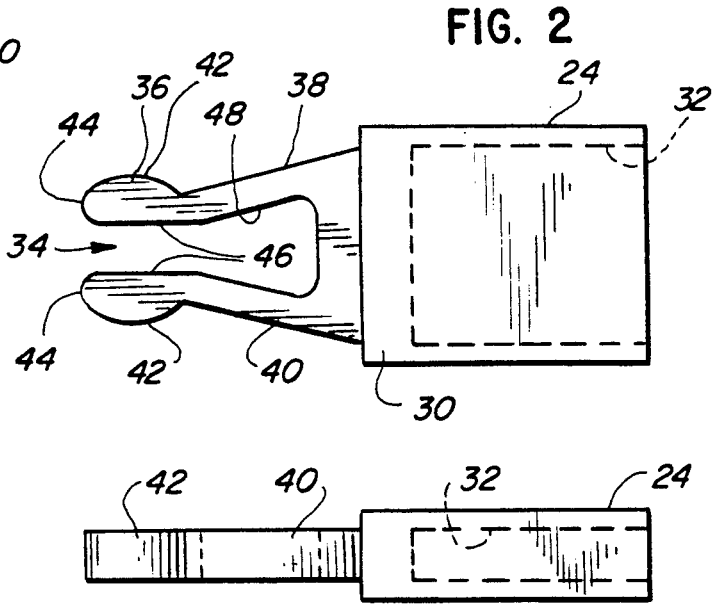
FIG. 2 is a plan view of a male fixture forming part of a break away element.
Figure 3:
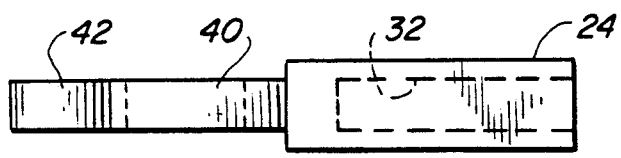
FIG. 3 is a side elevation of the male fixture.
Figure 4:
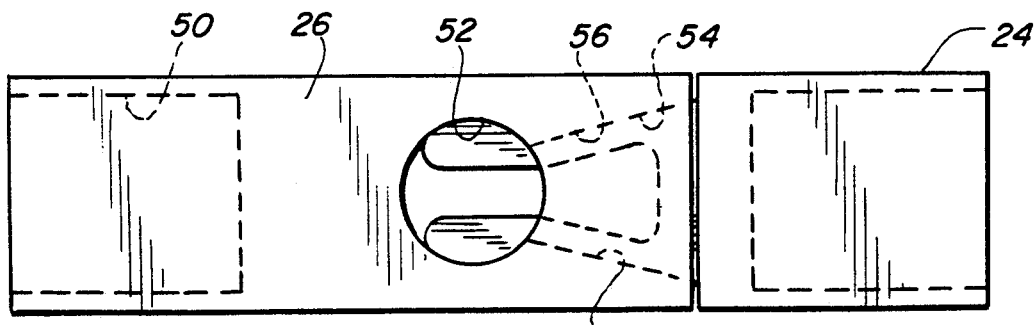
FIG. 4 illustrates a completed breakaway fixture in assembled condition including both male and female parts.

The construction of the breakaway assembly is illustrated in FIGS. 2, 3 and 4 and reference will now be made thereto. The male fixture 24 includes a base in the form of a rectangular solid of plastic or the like. The base 30 includes an interior recess 32 which is adapted to receive an end of the strap 10 which may be glued or solvent welded therein.

Opposite of the recess 32, the base 30 includes a bifurcated projection, generally designated 34, terminating in a circular tip 36. In the preferred embodiment of the invention, the projection 34 is defined by two fingers 38 and 40 integrally formed on the base 30 and each terminating in a semi-circular end 42. The ends 42 are not strictly semi-circular, being provided with rounded noses 44 for purposes to be seen.

The facing edges of the fingers 38 and 40 are defined by parallel edges 46 at the semi-circular ends 42 which then merge into a triangular recess 48 that extends almost back to the base 30.

The female fixture 26 is also in the form of a rectangular solid, also of plastic, and includes a strap receiving recess 50 identical to the recess 32. Oppositely of the recess 50, the female fixture includes a circular opening 52 which thus defines a circular interior recess within the fixture 26. A mouth 54 extends from the end of the fixture 26 opposite the recess 50 inwardly to the circular recess 52 and is defined by converging side walls 56. The side walls 56 are shaped and angled so as to snugly receive the fingers 38 and 40.

It will be noted that where the mouth 54 joins the recess 52, the side walls 56 are spaced apart a distance less than the diameter of the circular tip 36 but are sufficiently wide so that the walls 56 may cam the semi-circular ends 42 towards each other and allow circular tip 36 to enter the recess 52 and return to its normal configuration to secure two fixtures together. The rounded hoses 44 facilitate this mode of assembly.

When a separating force is applied to the fixtures 24 and 26, the circular shape of the recess 52 and the tip 36 allows the fingers 38 and 40 to be cammed towards each other such that the projection 34 may be pulled free from the recess 52 and the mouth 54 thereof.

Figure 5:
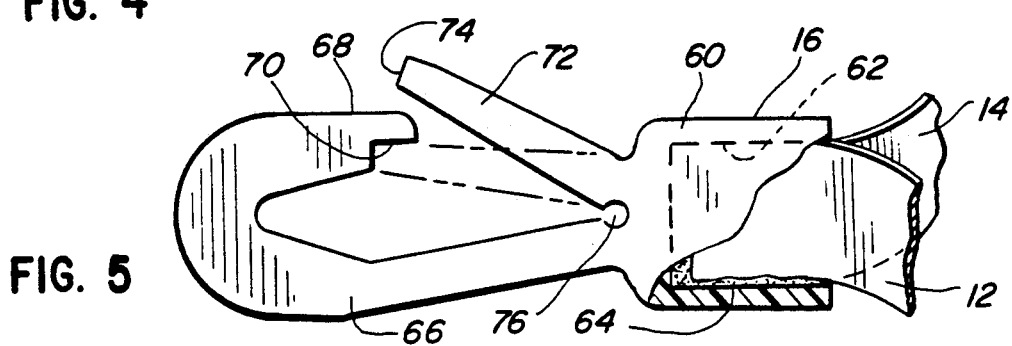
FIG. 5 is a view of a mounting element, specifically, a hook, with parts broken away for clarity.

FIG. 5 illustrates a preferred form of the mounting element or hook 16. As can be seen, the same includes a base 60 including a strap receiving recess 62 therein. The recess 62 is preferably identical to the recesses 32 and 50. As illustrated, the ends 12 and 14 of the strap 10 are disposed within the recess 62 and are bonded therein and to each other by adhesive or a solvent weld 64.

Extending from the base 60 oppositely of the recess 62 is an integral, relatively thick, stiff hook element 66 having a redirected end 68 facing the base 60.

Extending from the base 60 in adjacency to the hook 66 is a relatively thin finger 72. The finger 72 is integral with the base 60 and typically the mounting element will be made of plastic to provide for some resilience of the finger 72.

The finger 72 terminates in an end 74 which is inward of the end 68.

The finger 72 and the hook 66 join the base 60 at an interface and to provide for hinge like action whereby the finger 72 may be moved between the solid and dotted line positions, a recess 76 is located at the interface. As illustrated, in a preferred embodiment, the recess 76 is semi-circular in section.

From the foregoing, it will be appreciated that the invention provides a lanyard that may be worn safely at all times by reason of the breakaway provision it contains. Thus, it is ideally suited for use in carrying identification cards in areas wherein machinery is operating or may be used by sports officials to carry whistles or the like. Obviously, use of the lanyard is not limited to those specific instances but may be utilized in any case where safety dictates desirability of a breakaway feature.

It will also be appreciated that the invention provides a unique and simple but highly effective breakaway assembly as well as a mounting element in the form of a one piece plastic hook. Through the use of adhesive or solvent welding, the strap ends may be readily but strongly bonded to the various fixtures to avoid the need for crimped ferrules or the like Thus assembly is simplified.

I claim:

1. A lanyard construction comprising:
    means defining a strap forming a closed loop of flexible material for disposal about a part of a human body;
    a mounting element on said loop at a fixed location thereon for mounting an object to be displayed or used by the wearer of the lanyard; and
    means defining a weak point whereat said loop may open and be pulled free from the wearer, said weak point being at a location remote from said fixed location about the periphery of said loop.

2. The lanyard of claim 1 wherein said weak point defining means comprises interengaging male and female parts.

3. The lanyard of claim 1 wherein said weak point defining means includes a recess having a narrow opening and resilient fingers with enlarged tips disposable in said recess thru said opening.

4. The lanyard of claim 1 wherein said weak point defining means comprises mating fixtures secured in said loop, one of said fixtures including a generally circular recess and a mouth to said recess defined by converging walls opening to said recess, the other of said fixtures including a projection having a generally circular bifurcated tip of resilient material and receivable in said recess.

5. The lanyard of claim 1 wherein said lanyard is sized to be worn about the neck and said remote location is to the side of the neck of a wearer when said mounting element is in a lowermost position.

6. The lanyard of claim 1 wherein said mounting element is secured to two ends of said strap.

7. The lanyard of claim 6 wherein said mounting element is formed of a plastic material and includes a base with recess on one end thereof for receipt of said ends and bonding means bonding said ends to each other and to the mounting element.

8. The lanyard of claim 7 wherein said mounting element includes a relatively thick and rigid hook opposite of said recess and an integral, relatively thin and resilient finger extending from said base into engagement with said hook.

9. A breakaway assembly comprising:
a first fixture including a base having a resilient projection with a bifurcated, generally circular tip and means on said base for securing a strap thereto, and
a second fixture including a recess opening to the exterior of said second fixture, said recess including a circular inner end of about the same size as said tip and a mouth opening to said inner end defined by converging walls, said walls, adjacent said inner end, being spaced a distance less than the diameter of said tip, and means for securing a strap thereto.

10. The breakaway assembly of claim 9 wherein said projection is defined by two spaced fingers and said circular tip includes a semicircular end on each of said fingers.

11. The breakaway assembly of claim 10 wherein at least of one of said securing means comprises a strap receiving recess.

12. A lanyard or the like including the breakaway assembly of claim 9 further including at least one strap secured to each of said securing means.

13. A hook assembly comprising:
a base having a strap receiving recess;
an integral hook extending from said base and terminating in a redirected end facing said base; and
an integral resilient finger on said base adjacent said hook and extending toward and engagable with said end;
said assembly being formed of a single piece of plastic;
said finger and said hook coming together at said base in an interface and further including a recess with a circular inner end at said interface.

14. The hook assembly of claim 13 wherein said recess at said interface is semi-circular.

* * * * *